United States Patent [19]

Jensen et al.

[11] Patent Number: 4,816,229
[45] Date of Patent: Mar. 28, 1989

[54] OZONE APPARATUS

[75] Inventors: Craig J. Jensen, Cedar Rapids, Iowa; Herbert Heyroth, Ahnatal, Fed. Rep. of Germany

[73] Assignee: American Ozone Technology, Inc., Marion, Iowa

[21] Appl. No.: 53,467

[22] Filed: May 26, 1987

Related U.S. Application Data

[62] Division of Ser. No. 883,658, Jul. 9, 1986.

[51] Int. Cl.$^4$ .................. B01J 19/08; C01B 13/11
[52] U.S. Cl. ..................... 422/186.2; 422/186.07
[58] Field of Search ............ 422/186.07, 186.2, 907; 204/176

[56] References Cited

U.S. PATENT DOCUMENTS

| | | | |
|---|---|---|---|
| 577,636 | 2/1897 | Andreoli | 422/186.2 |
| 807,964 | 12/1905 | Rice | 422/186.07 X |
| 955,818 | 4/1910 | Lohman | 422/186.15 |
| 1,588,976 | 6/1926 | McBlain | 422/186.07 |
| 2,113,913 | 4/1938 | Cragun | 422/186.07 |
| 2,615,841 | 10/1952 | Thorp et al. | 422/186.16 |
| 2,822,327 | 2/1958 | Hammesfahr et al. | 422/186.07 X |
| 4,062,748 | 12/1977 | Imris . | |
| 4,095,115 | 6/1978 | Orr, Jr. et al. . | |
| 4,599,166 | 7/1986 | Gesslauer . | |
| 4,614,573 | 9/1986 | Masuda | 422/186.04 X |
| 4,666,679 | 5/1987 | Masuda et al. | 422/186.07 X |

Primary Examiner—Richard D. Lovering
Assistant Examiner—Susan Wolffe
Attorney, Agent, or Firm—Hill, Van Santen, Steadman & Simpson

[57] ABSTRACT

An ozone generator where the ozone generator comprises a first electrical conductive plate and an insulating plate with a thin ozone generating chamber between them and a second electrical conducting plate attached to the insulating plate and cooling fins and liquid cooling pipes connected to the ozone generator.

1 Claim, 4 Drawing Sheets

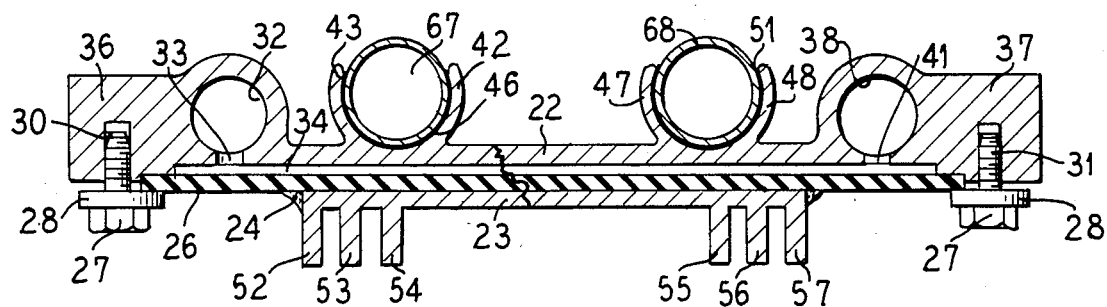
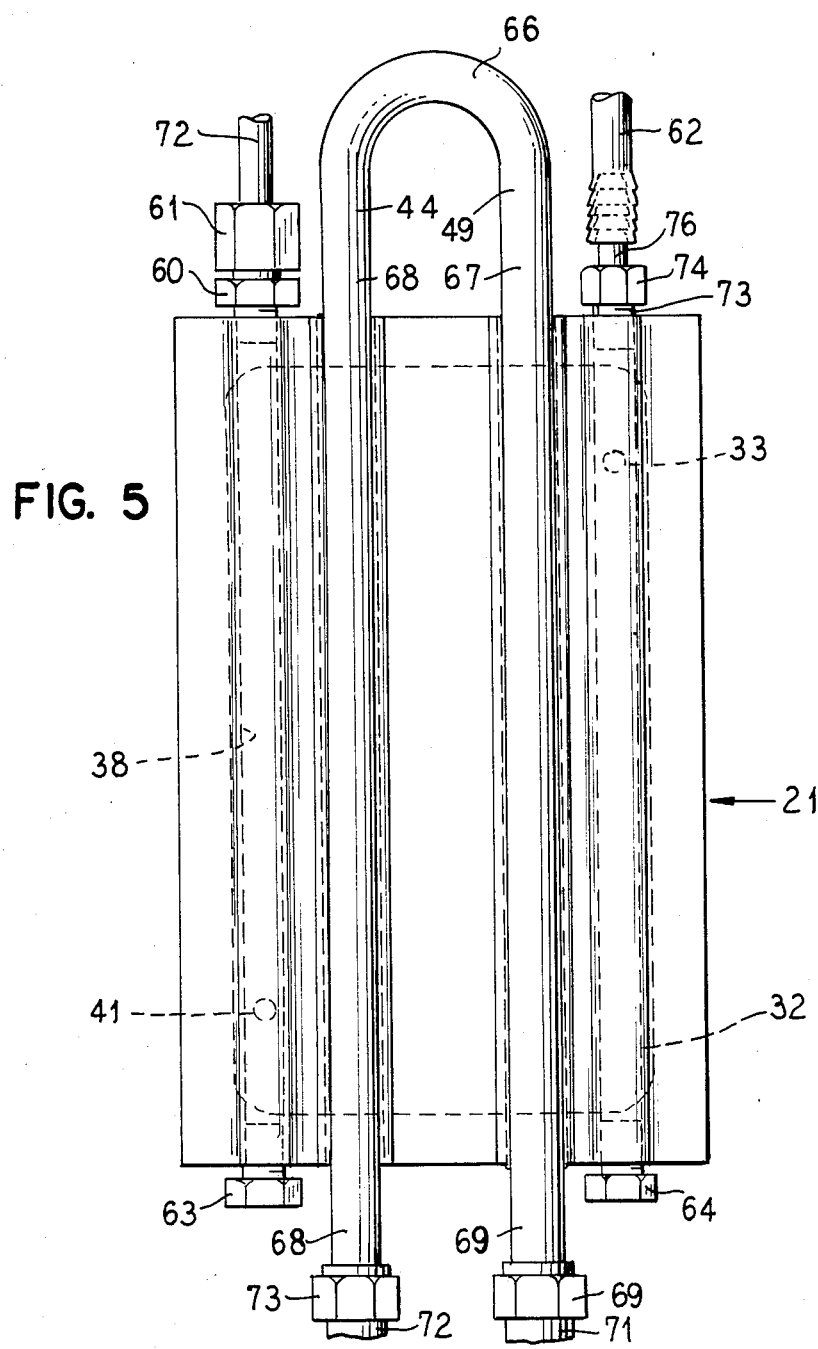

OZONE APPARATUS

This is a division, of application Ser. No. 883,658, filed July 9, 1986.

BACKGROUND OF THE INVENTION

1. Field of the Invention

This invention relates in general to ozone generators such as are used for water purification, for example, and in particular to a novel air drying system including various monitoring devices and control apparatus as well as to a novel ozone generator.

2. Description of the Prior Art

In ozone generators, it is necessary at times to use air which has very little moisture as, for example, in some applications the dew point must be below 27° F. and this equals approximately 1-2% of humidity at 70° F. All inexpensive humidity sensors are incapable of measuring humidity below approximately 10%.

SUMMARY OF THE INVENTION

The present invention is capable of sensing the humidity in an ultra dry air system which has risen above a set point and still provide ultra dry air to the system. Moisture sensors will not sense relative humidity below approximately 10%, however, in some applications, it is necessary to ensure that the ultra dry air remains available to the system without regard to the incoming moisture content of the air.

In the present invention, a large capacitor dryer is utilized to initially dry the air and when the large capacity dryer becomes saturated, the moisture in the air leaving the large capacity dryer will rise to a level that is detectable by a standard humidity sensor. Such humidity sensor is placed between a large capacity dryer and a small capacity dryer. Because the small capacity dryer will continue to remove moisture from the air after the large capacity dryer has become saturated and until the large capacity dryer is replenished, ultra dry air will still be available to the system.

When the humidity sensor senses an increase in humidity, an alarm may be sounded so that the large capacity dryer can be changed or the system can be safely shut off without the humidity of the output air rising. After the large capacity dryer is changed, the dry air will replenish the small capacity dryer so it will be ready for the next time when the large capacity dryer becomes saturated.

The invention also includes a novel ozone generator.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

BRIEF DESCRIPTION OF THE DRAWINGS

FIG. 5 is a rear view of the ozone generator; and

FIG. 6 is a top view of the ozone generator.

DESCRIPTION OF THE PREFERRED EMBODIMENTS

Ozone is a powerful oxident and disinfectant and is a more powerful oxidizing agent than oxygen. The Food and Drug Administration of the U.S. Government lists ozone as generally recognized as safe for its use as a disinfectant in bottle water plants. Ozone is also used to eliminate tastes and odors. Ozone has a greater germacidal effectiveness against bacteria and viruses than chlorine. Ozones ability to disinfect drinking water due to its oxidation powers in addition to its disinfection capabilities make it an alternative to the use of chlorine.

Ozone does not form chloramines or other chloro derivatives and its potency is effective over a wide range of pH, temperature, or ammonia content. Ozone reduces the iron magnanese, lead and sulfur concentrations in water. An advantage of ozone pretreatment by oxidation is that it can result in precipitation (microfloccultion) of organic materials and thus lower the load on the filter, ion exchange resin, or other treatment apparatus.

Figure 1:
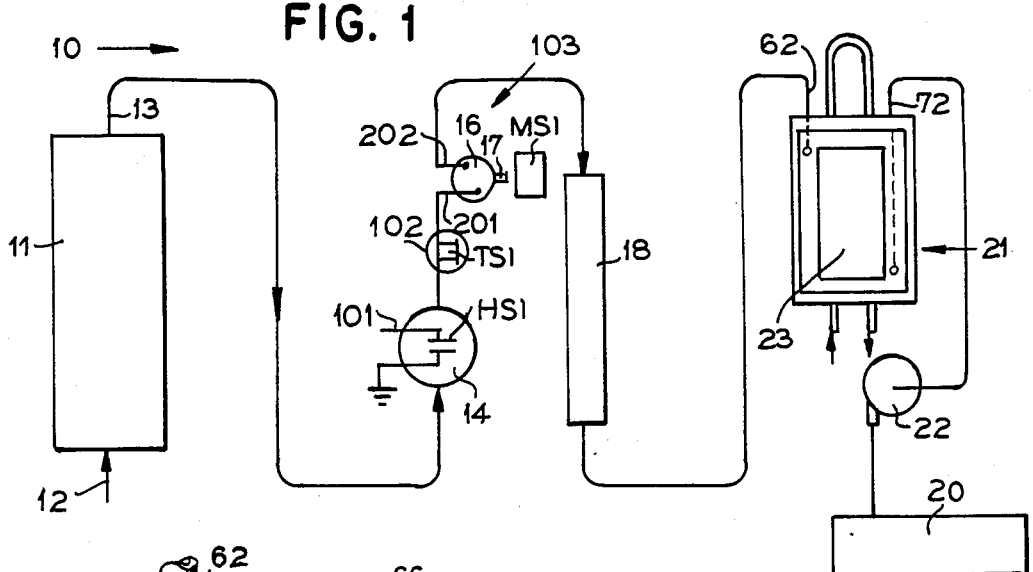
FIG. 1 is an overall schematic view of the apparatus of the invention.
Figure 3:
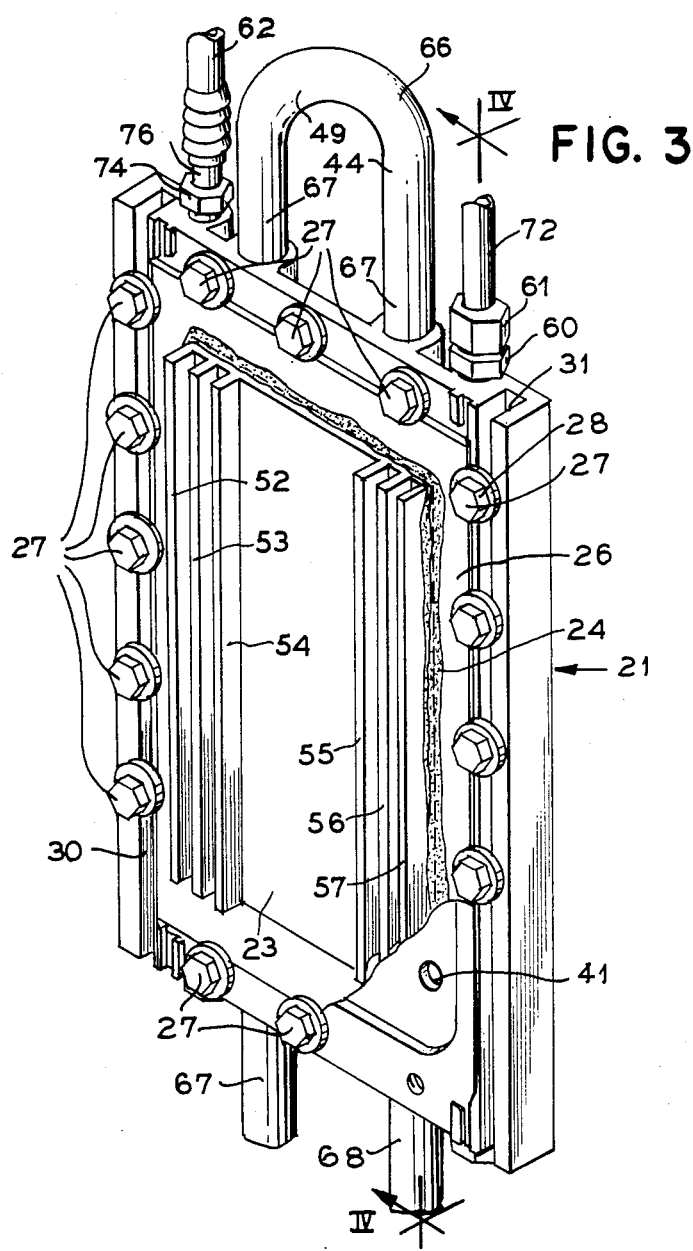
FIG. 3 is a perspective view of the ozone generator of the invention.
Figure 4:
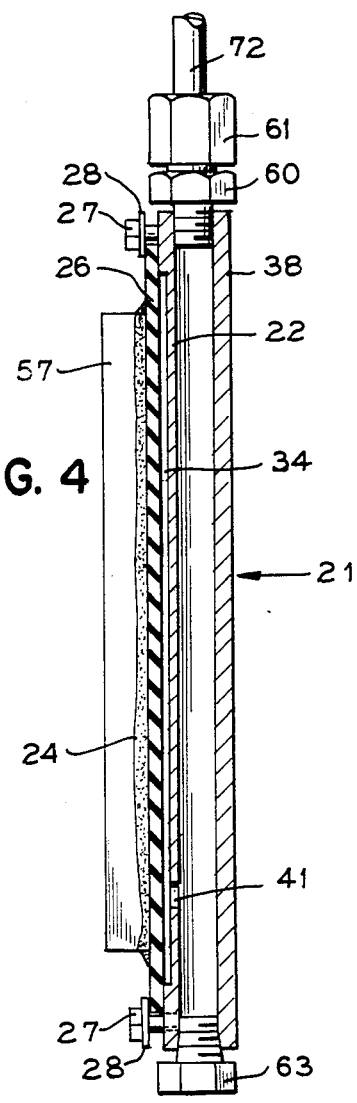
FIG. 4 is a sectional view of the ozone generator taken on line IV—IV from FIG. 3.

Ozone is unexcelled in destroying bacteria and killing virus and, thus, reduces the rate of biofouling of filters, membranes or ion exchange resins. FIG. 1 illustrates an ozone generator system 10 according to the invention wherein ambient air enters a dryer 11 of large capacity through the opening 12. The incoming air may have high humidity which must be reduced to relatively dry air before converting the oxygen into ozone. The large capacitor dryer 11 has an output conduit 13 which supplies the dried air to a moisture sensor 14 which includes a moisture sensing component HS1. The air after passing the moisture sensor 14 passes to an air flow sensor 102 which includes 2 temperature sensors TS1 and TS2. The air flow sensor supplies the air to a blocked line sensor 103 which includes a diaphragm 16 which moves a magnet 17 to control a Hall effect detector MS1. The output of the block line sensor 103 is supplied to a small capacity dryer 18 and then passes to the input conduit 62 of the ozone generator 21 where it is converted into ozone and then passes through an output conduit 72 to a blower 22 which supplies power for drawing the air through the system and to a utilization device 20 where the ozone is used by injecting it into water or other substances so as to purify it.

In the invention, in addition to the moisture sensor 101, the air flow sensor 102 and the blocked line sensor 103 there is a high voltage sensor which senses for example whether the high voltage as, for example, 4000 volts is applied to the ozone generator 21 so as to properly operate the ozone generator to produce ozone. The outputs of these four sensors comprising the air flow sensor, the moisture sensor, the blocked air line sensor and the high voltage sensor are combined and supplied to a logic circuit which operates to turn the system off or to produce an alarm as required. For example, there is a power indicating light which is a LED1 illustrated in FIG. 2B which indicates that power is applied to the unit. There is a change dryer indicator comprising a LED2 illustrated in FIG. 2A and there is an operation failure indicator LED3 illustrated in FIG. 2A.

Figure 2A:
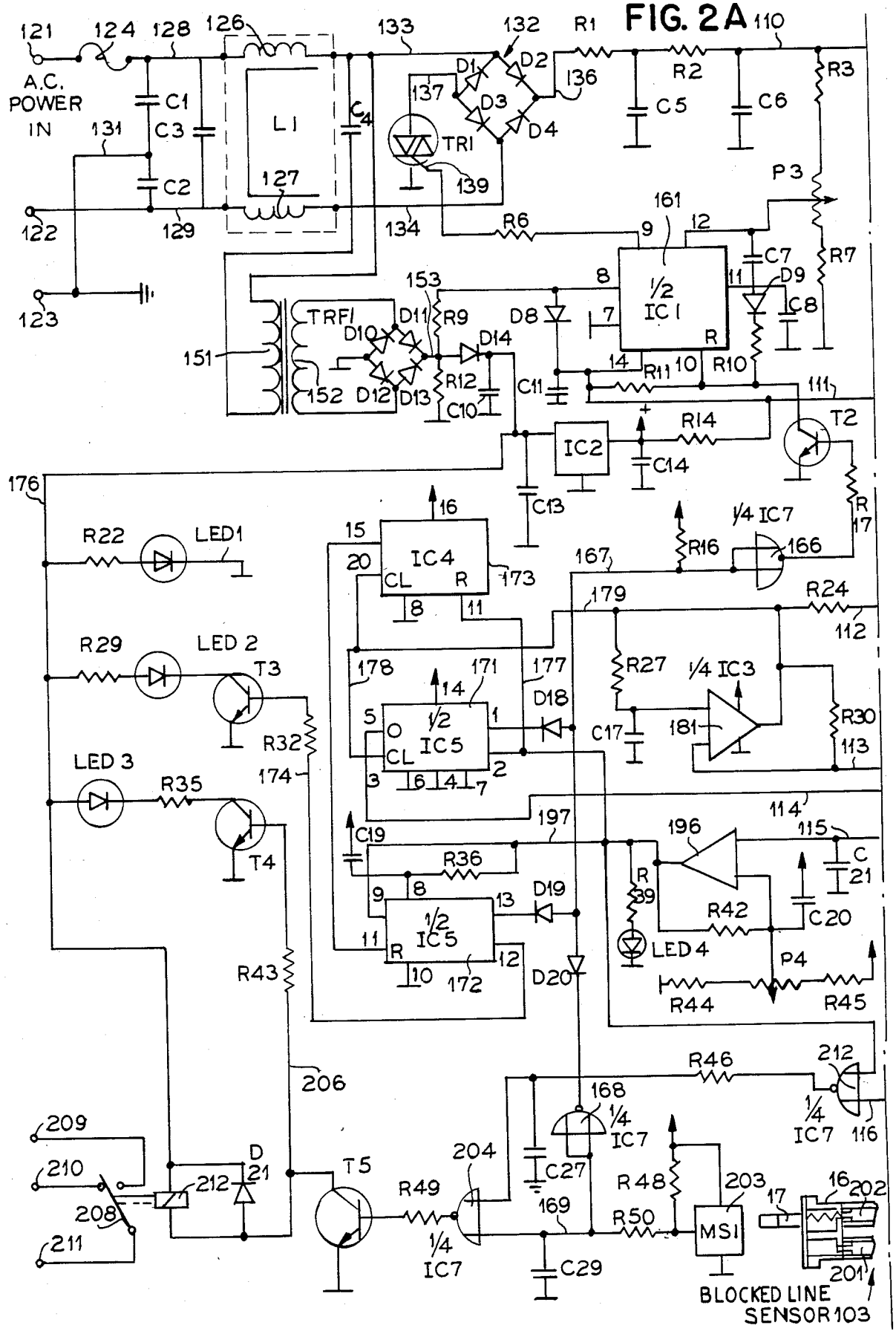
FIGS. 2A and 2B comprise an electrical schematic diagram of the control system of the invention.
Figure 2B:
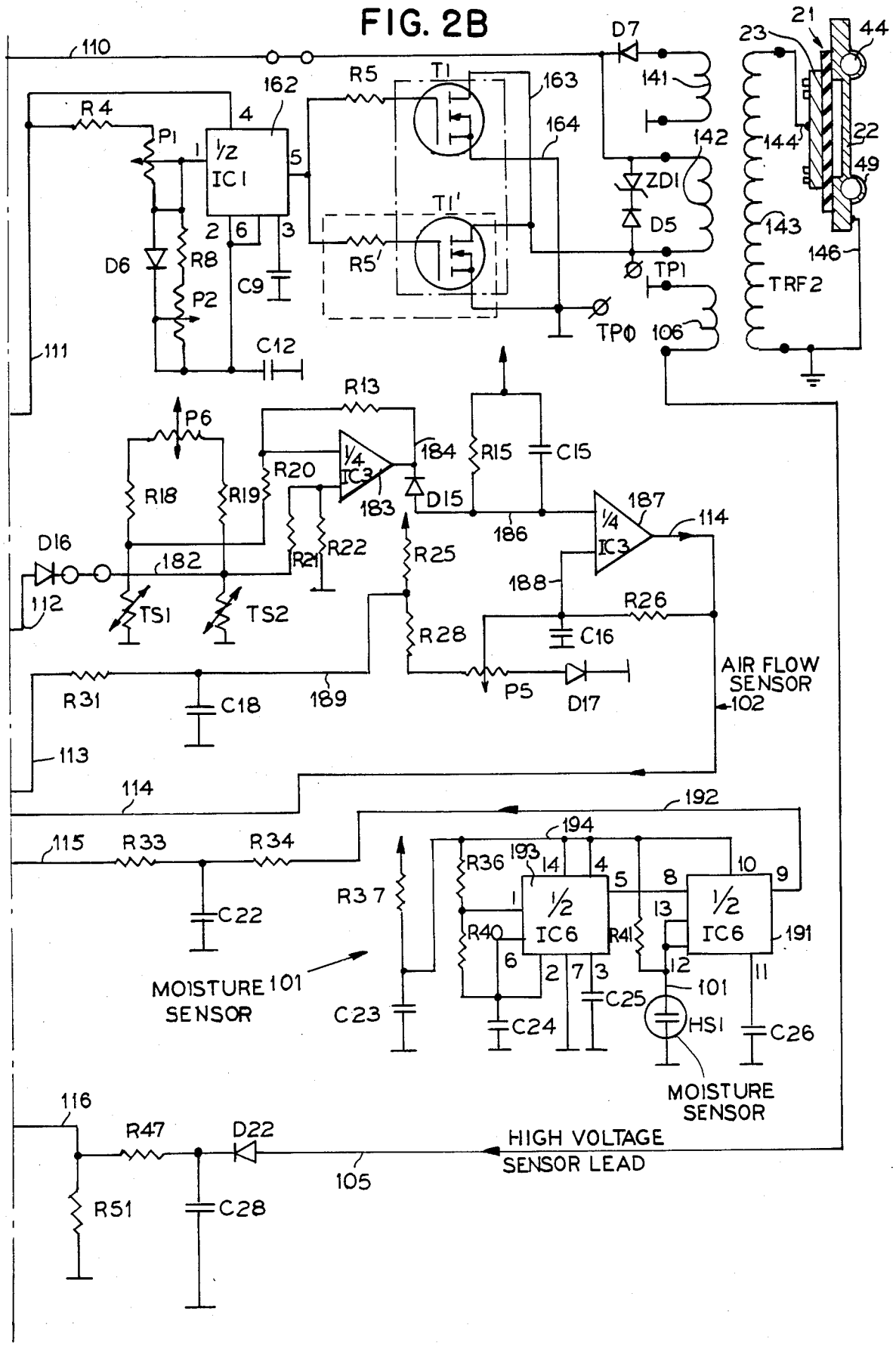

FIGS. 2A and 2B comprise the electrical schematic of the monitoring and warning system of the invention. An Ac power source is supplied to input power leads 121 and 122 and to a grounded lead 123. A fuse 124 is connected between terminal 121 and series inductors L1 comprising an inductor 126 connected in series with one line and an inductor 127 connected in series with the other line. Capacitors C1 and C2 are connected in series between lines 128 and 129 and a lead 131 is connected from terminal 123 and ground to the midpoint between the condensors C1 and C2. The capacitor C3 is connected in parallel with the capacitors C1 and C2. A diode rectifier bridge 132 comprises diodes D1 through D4 and is connected to input leads 133 and 134. The triac TR1 has a output lead 137 connected to an input of the diode rectifier 132 and has its other terminal connected to a common neutral. The output of the diode rectifier is supplied to a lead 136 which is connected to a series resistor R1 and a series resistor R2. A capacitor C5 is connected between the junction point between resistors R1 and R2 and neutral. The resistor R2 is connected to a lead 110 and a capacitor C6 is connected between lead 110 and ground. Lead 110 is connected through a diode D7 to a primary 141 of a transformer TRF2 which has a secondary 143 that has one end 144 connected to a plate 23 of the ozone generator 21 and the other lead 146 is connected to ground and to the other plate 22 of the ozone generator 21. The primary 151 of a transformer TRF1 comprises a line transformer and has its secondary 152 connected to a diode rectifier bridge comprising the diodes D10 through D13. The primary 152 of the line transformer TRF1 is connected to the diode rectifier and an output lead 153 of the diode rectifier is connected to the junction point between a pair of resistors R9 and R12. The other side of R12 is connected to neutral and the other side of resistor R9 is connected to one-half 161 of an integrated circuit IC1. A diode D8 and a capacitor C11 are connected between terminal 8 of the integrated circuit 161 and neutral. A resistor R11 is connected between terminals 10 and 14 of the integrated circuit 161. Output 9 of integrated circuit 161 is connected to resistor R6 which has its opposite side connected to the gate 139 of the triac TR1. Output 12 of the integrated circuit 161 is connected to a potentiometer P3 which is connected between a resistor R3 which has its other side connected to lead 110 and a resistor R7 which has its other side connected to neutral. A capacitor C7 and diode D9 and a resistor R10 are connected between output 12 and 10 of the integrated circuit 161. Lead 111 is connected to output 14 of the integrated circuit IC161 and supplies an input to one-half of the IC1 162 at terminal 4. A resistor R4 is connected to a potentiometer P1 which has an output connected to input number 1 of integrated circuit IC1 162. A resistor R8, a potentiometer P2 and a capacitor C12 are connected betweeen terminal 1 and neutral of integrated circuit 162. A diode D6 is connected between terminal 1 of integrated circuit 162 and terminal 2 of integrated circuit as well as to the potentiometer P2. A capacitor C9 is connected between terminal 3 of integrated circuit 162 and ground. Terminal 5 of integrated circuit 162 is connected through a resistor R5 to a power type MOSFET T1 which has its output leads 163 and 164 connected to a primary 142 of transformer TRF2. A zener diode ZD1 is connected in series with a diode D5 between leads 163 and 164. A second power type MOSFET indicated as T1' can be mounted in parallel with the MOS-FET T1 and connected to output leads 163 and 164 as illustrated. Terminal 14 of integrated circuit 161 is connected through resistor R11 to the collector of a transistor T2 which has its emitter connected to neutral and its base connected through a resistor R17 to a gate 166 which may be one-fourth of an integrated circuit IC7. The gate 166 receives an input from lead 167 which is connected to a diode D20 which is connected to a gate 168 which receives input from lead 169.

Lead 167 is also connected through diode D18 to an integrated circuit 171 and through a diode D19 to an integrated circuit 172. The integrated circuit 172 supplies an output on lead 174 from terminal 12 to the base of a transistor T3 which has its emitter connected to neutral and its collector connected to one side of LED2. The other side of LED2 is connected through resistor R29 to lead 176 which is connected through a diode D14 to lead 153. A capacitor C10 is connected between diode D14 and neutral. An integrated circuit IC2 is connected between lead 176 to one side of capacitor C14 which has its other side connected to neutral. A resistor R14 is connected between the integrator circuit IC2 and terminal 14 of integrated circuit 161. Output 2 of integrated circuit 171 is connected by lead 177 to the reset terminal 11 of integrated circuit 173. Terminal 15 of integrated circuit 173 is connected to terminal 11 of integrated circuit 172. Lead 178 is connected between terminal 20 of integrated circuit 173 and terminal 3 of integrated circuit 171. Lead 179 is connected to lead 178 and to a resistor R27 which has its other side connected to an input to an integrated circuit IC3, 181, which has its output connected to lead 179 and a resistor R30 is connected between the output and a second input on lead 113 to integrated circuit 181. Lead 112 is connected through diode D16 to a temperature sensor TS2 which has its other side connectec to neutral. A second transistor TS1 is mounted in the air sensor 102 as illustrated in FIG. 1 and has one side connected to neutral and the other side connected to a resistor R18 which is connected through a potentiometer P6 and through a resistor R19 to lead 182 which is connected to temperature sensor TS2 as illustrated. A resistor R21 is connected between lead 182 and integrated circuit 183. A resistor R22 is connected between neutral and the input to integrated circuit 183. A resistor R20 is connected from temperature sensor TS1 to a second input of the integrated circuit 183 and a resistor R13 is connected between the second input of the integrated circuit 183 and its output 184. A diode D15 is connected between lead 184 and lead 186 which is connected to an integrated circuit 187. A resistor R15 and a capacitor C15 are connected in parallel between lead 186 and a voltage source. The output of integrated circuit 187 is connected to lead 114 which supplies an input on terminal 5 to integrated circuit 171 and comprises the output of the air flow sensor 102. A resistor R26 is connected between lead 114 and lead 188 which supplies a second input into integrated circuit 187. A capacitor C16 is connected between lead 188 and neutral. A potentiometer P5 is connected in series with a diode D17 and a resistor R28 which is connected to a lead 189. A capacitor C18 is connected from lead 189 to ground and resistor R31 is connected from lead 189 to lead 113 as shown.

The moisture sensor 101 comprises a moisture sensing capacitor HS1 which has one side connected to neutral and the other side connected to terminals 12 and 13 of integrated circuit 191. Capacitor C26 is connected between neutral and terminal 11 of integrated circuit 191. Terminal 9 of integrated circuit 191 is connected to lead 192 which is connected to resistor R34. Integrated circuit 193 has its terminal 5 connected to terminal 8 of integrated circuit 191 and receives an input from between resistors R37 which is connected to a suitable voltage and a capacitor C23 which is connected to neutral on lead 194 which is applied to terminals 14 and 4. Resistor R36 and R40 are connected between lead 194 and terminal 2 of integrated circuit 193. A capacitor C24 is connected between neutral and terminal 6 of integrated circuit 193. Capacitor C25 is connected between neutral and input terminal 3 of integrated circuit 193. A capacitor C22 is connected between resistor R34 and neutral and a resistor R33 is connected between resistor R34 and lead 115 which has its other side connected to an integrated circuit 196 which has an output that is supplied to lead 197 which is connected to integrated circuit 172 on terminal 9 and through resistor R36 to terminal 8 of the integrated circuit 172. The capacitor C21 is connected from lead 115 and neutral. A resistor R42 is connected between the output and input of integrated circuit 196. A potentiometer P4 is connected between resistor R44 which has its other side connected to neutral and resistor R45 which has its other side connected to a suitable voltage source and the potentiometer is also connected to the junction point between resistors R42 and capacitor C20. LED4 has one side connected to neutral, and the other side connected through a resistor R39 to lead 197. The diaphragm 16 is actuated by the air pressure in the line and receives the air flow through conduits 201 and 202 and the diaphragm moves in response to the air pressure to position a magnet 17 relative to a Hall sensor MS 1 designated by 203. The Hall sensor 203 is connected through resistor R50 to input of gate of integrated circuit 204. A resistor R48 is connected between a suitable voltage source and the hall effect detector 203. A capacitor C29 is connected between neutral and the second gate of integrated circuit 204. A resistor R49 is connected to the output of gate 204 and to the base of a transistor T5 which has its emitter connected to neutral and its collector connected to a lead 206 which is connected to the base of transistor T4 which has its emitter connected to ground and its collector connected through a resistor R35 to LED3 which indicates operation failure and which has its other side connected to lead 176. The collector of transistor T5 is also connected to a relay 212 which controls a switch contact 208 between terminals 211, 209 and 210.

In operation, if high voltage is not applied to the plates 22 and 23 of the ozone generator 21, this will be sensed by the secondary 106 of transformer TRF2 and a signal passes from lead 105 gate 212, gate 204 to transistor T5, lead 206 and transistor T4 to actuate LED3 which indicates operation failure of the system. Also, the relay 207 is actuated to turn off power to the system under this condition.

The air flow sensor 102 which is mounted in the air flow line provides an output on lead 114 which is applied to integrated circuit 171 and through the logic circuits of integrated circuits 173 and 172 to lead 174. The moisture sensor 101 provides an output on lead 197 to integrated circuit 172 which provides an output on lead 174. Integrated circuit 196 also supplies an output through resistor R39 to LED4.

When the diaphragm 16 moves the magnet 17 to actuate the Hall effect detector 203 it produces an output on lead 169 which is supplied through gate 204 and transistors T5 and T4 to LED3. The output on lead 169 is also supplied through gate 168 and diode D20, and diode D19 to integrated circuit 172 and through diode D18 to integrated circuit 171.

The triac TR1 may be type T1C206D. Integrated circuit IC2 may be a type MC7812CT. The magnetic sensor MS1 may be a Siemens Type S251.

Integrated circuits 1 and 6 may be type NE556N. The integrated circuit 3 may be LM324DP. Integrated circuit IC4 may be type CD4040 B. Integrated circuit IC may be type CD4013B and integrated circuit IC7 may be type CD4011B. Transistors T2 through T5 may be NPN transistors type BC547B. Diode D7 may be a type RGP10K. Diodes D1 through D5 may be type 1N4004. Diodes D6, 8 through 22 may be type 1N4148. The Zener diode ZD1 may be a type ZPY47. The temperature sensors TS1 and TS2 may be type TSF102J. LED3 may be red type CQY54A. LED2 may be a yellow type COY97A. LEDS 1 and 4 may be green type CQY95B. The humidity sensor HS1 may be a type 2322691 90001 VALVO. Capacitors C5 and C6 may be electrolytic capacitors 100 mfd/160 volt. Capacitor C10 may be 100 mfd/35 volts. Capacitors C8, 11, 23 may be 100 mfd/16 volts. Capacitors C15, 16, 18–20, 27–29 may be 4.7 mfd/63 volts. Capacitor 13, 14, 17, 21 and 22 may be 0.1 mfd/63 volts. Capacitors C12 and C24 may be 2200 pF/63 volt. Capacitors 7, 9, 25, 26 may be 0.01 mfd/63 volts. Potentiometer 1 may be 4K7. Potentiometer P2 may be 220K. Potentiometers 3 and 4 may be 10K. Potentiometers 5 and 6 may be 2K2.

Transformer TRF2 may be a high voltage transformer type FAT 37 48Koenig. The inductor L1 may be type B82723-G2-B8 Siemens. Capacitors C1 and C2 may be Siemens type B81121-C-B143. Capacitors C3 and C4 may be Siemens type B81121-C-B125. Resistor R1 may be 5R6. Resistor R2 may be 22 R. Resistors 3 and 41 may be 150K. Resistors 4, 7, 11, 16–21, 25, 32, 34, 43 through 45, may be 10K. Resistor R5, 14 and 37 may be 33 R. Resistor R6 and R10 may be 1K0. Resistors R8, 9, 22 and 30 may be 220K. Resistors R12, 26, 31, 33, 46–48 and 51 may be 100K. Resistors R15, R42 may be 1MO. Resistors R24 and 40 may be 470K. Resistors 27 and 36 may be 470K. Resistors R28 may be 8K2.

The ozone generator is shown in greater detail in FIGS. 3 through 6. The dry air from the small dryer 18 passes to the input conduit 62 to the ozone generator 21 where it is converted into ozone and exits from the ozone generator at conduit 72 as illustrated in FIG. 1. The high voltage plate 23 may be made of extruded aluminum and has cooling ribs such as 52, 53, 54 on one side thereof and 55, 56 and 57 on the other side as illustrated for example in FIGS. 3 and 6. Electrical lead 144 is electrically connected to the plate 23. Plate 23 is connected by suitable cement 24 to a ceramic cover plate 26. The ceramic cover plate 26 is connected by bolts 27 and washers 28 to the back plate 22. The back plate 22 is formed as an extruded aluminum plate as, for example, illustrated in FIG. 6. The extruded material is cut to length and then an ozone manufacturing chamber 34 is formed in the face of plate 22. As shown for example in FIGS. 3 and 6, longitudinal grooves 30 and 31 are formed along the outer edges of plate 22 and the threaded portion of bolts 27 are received in the grooves 30 and 31 so as to self-tap threads therein to hold the plate 23 to the plate 22. The conduit 62 is connected to a tube 76 which is connected by a coupler nut 74 to an air intake chamber 32 formed in the plate 22 during extrusion. A second plug 64 is threadedly received in the lower end of conduit 32 so as to seal it. An opening 33 is formed adjacent a top portion of conduit 32 so as to allow the incoming dry air to pass into the ozone generating space 34 between plate 22 and 26. The dry air moves from opening 33 at the upper left relative to FIG. 3 down through the space 34 between the plates 26 and 22 to an opening 41 formed in plate 22 near the lower right hand corner relative to FIG. 3 which communicates with an output conduit 38 formed along the edge of plate 22 adjacent the groove 31.

A sealing plug 63 is threadedly received in the lower end of conduit 38. The upper end of conduit 38 is connected by a coupling 60 to a coupling member 61 which attaches it and seals it to an outlet tube 72 as illustrated, for example, in FIGS. 3, 4 and 5. It has been discovered that during the production of ozone that the output of the ozone generator substantially decreases if the temperature of the ozone generator rises above 80° F. So as to cool the ozone generator and maintain its temperature at a low level, a cooling water supply system is attached to the plate 22. An input water pipe 67 is connected by coupler 69 to an input supply water pipe 71. The supply pipe 67 is held in a receiving bracket formed during extrusion by fingers 42 and 43 and the conduit 68 is held to plate 2 by extruded bracket members 47 and 48. Suitable glue 46 and 51 can be used to firmly attach the conduits 67 and 68 to the plate 22. The U-shape member 66 joins the upper ends of conduit 68 and 67 so as to provide a completed path through the ozone generator.

It has been discovered that the improved ozone generator and manifold of the invention results in very high production of ozone. As the dry oxygen comes in the input conduit 62 and passes through the opening 33 between the plates 26 and 22 where it is subjected to a high voltage a blue corona exists and a certain percentage of oxygen is turned into ozone. For example, one gram of ozone per hour can be generated using 50 watts of power. The thickness of the gap 34 is very important. The plate 22 provides an extrusion heat sink. In a particular embodiment, the thickness of the gap 34 was 0.075 inches and the length of the ozone generating space was 6.40 inches and the width was 3.10 inches between the inlet and outlet openings 33 and 41. With an applied voltage of 4000 volts, a substantial amount of ozone was produced. The cooling water supplied to the inlet pipe 67 was between 50° and 60° F. which dissipated the 30-50 watts of heat generated in the ozone generator and maintained the temperature below 80° F. in the ozone generating chamber 34.

It is seen that this invention provides a new and novel control system and an ozone generator and although it has been described with respect to preferred embodiments it is not to be so limited as changes and modifications may be made which are within the full intended scope as defined by the appended claims.

We claim as our invention:

1. An ozone generator comprising a first planar plate of electrical conductive material, an insulating planar plate attached to said first plate, and the outer edges of said insulating plate and said first plate in contact and formed with a depression to form a space between said plates inboard of said outer edges to form an ozone generating chamber, a first air inlet passage into said space to provide oxygen into said space at a first corner of said space, a second air outlet passage from said space located remotely at a second corner which is diagonally opposite from said first air inlet passage to allow ozone and oxygen to be removed, and a high voltage source connected to apply high voltage between said first plate and said insulating plate, including a second planar plate of electrical conductive material attached to said insulating plate and out of contact with said first plate and said high voltage source connected to said first and second plates, including cooling fins attached to said first or second plates, including a liquid cooling means connected to said ozone generator to prevent it from becoming too warm, and wherein said liquid cooling means comprises water cooling pipes to which a supply of cooling water is connected.

* * * * *